United States Patent
Tate (10) Patent No.: US 9,897,146 B2
(45) Date of Patent: Feb. 20, 2018

(54) METHOD OF PROVIDING LUBRICANT TO A BEARING ASSEMBLY

(71) Applicant: Schaeffler Technologies AG & Co. KG, Herzogenaurach (DE)

(72) Inventor: John Tate, Cornelius, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 347 days.

(21) Appl. No.: 14/632,570

(22) Filed: Feb. 26, 2015

(65) Prior Publication Data

US 2015/0252851 A1    Sep. 10, 2015

Related U.S. Application Data

(60) Provisional application No. 61/948,965, filed on Mar. 6, 2014.

(51) Int. Cl.
| | |
|---|---|
| B21D 53/10 | (2006.01) |
| B23P 25/00 | (2006.01) |
| F16C 33/66 | (2006.01) |
| F16C 43/04 | (2006.01) |
| F16C 19/30 | (2006.01) |
| B21K 1/76 | (2006.01) |
| F16C 19/46 | (2006.01) |

(52) U.S. Cl.
CPC ........ F16C 33/6659 (2013.01); F16C 19/305 (2013.01); F16C 33/6614 (2013.01); F16C 33/6651 (2013.01); F16C 43/04 (2013.01); F16C 19/46 (2013.01); F16C 2208/32 (2013.01); Y10T 29/49702 (2015.01)

(58) Field of Classification Search
CPC .............. F16C 33/6659; F16C 33/6651; F16C 19/305; F16C 33/6614; F16C 43/04; F16C 2208/32; F16C 19/46; Y10T 29/497; Y10T 29/49702; Y10T 29/49826; Y10T 29/49885; Y10T 29/49982; Y10T 29/49696; Y10T 29/49703
USPC ............. 29/428, 898.1, 898.12, 898.07, 458, 29/527.2; 384/462
See application file for complete search history.

(56) References Cited

U.S. PATENT DOCUMENTS 3,469,655 A * 9/1969 Moreno .............. F16C 33/6622
                                                184/105.1
3,847,248 A * 11/1974 Avery ...................... F16D 1/06
                                                    184/109

(Continued)

OTHER PUBLICATIONS

"PTFE Membranes Publication", dated Jan. 1, 2013.
"PTFE Membrane Circles TE Range Website", dated Jan. 1, 2013, retrieved Feb. 26, 2015.

Primary Examiner — Sarang Afzali
Assistant Examiner — Darrell C Ford
(74) Attorney, Agent, or Firm — Volpe and Koenig, P.C.

(57) ABSTRACT

A method of providing lubricant to a bearing assembly is provided. The method includes providing a bearing assembly including a housing with an inner surface that forms an outer race, a plurality of rolling elements that roll on the outer race, and a packet having a rupturable membrane and a predetermined volume of lubricant therein. At least one of a shaft or a cage is inserted into the bearing assembly and ruptures the packet via engagement of the packet with at least one of the shaft or the cage such that the volume of lubricant is distributed to contact surfaces of the bearing assembly.

9 Claims, 6 Drawing Sheets

(56) References Cited

U.S. PATENT DOCUMENTS

| | | | | |
|---|---|---|---|---|
| 4,778,285 | A | * | 10/1988 | Larson .................. F16C 33/102 |
| | | | | 141/329 |
| 4,913,263 | A | | 4/1990 | Spiers |
| 5,141,340 | A | * | 8/1992 | Van Tonder ............ F16C 33/76 |
| | | | | 384/462 |
| 6,450,690 | B1 | * | 9/2002 | Dischler ................. F16C 35/04 |
| | | | | 184/5.1 |
| 6,533,363 | B1 | * | 3/2003 | Hayes ............... F16C 33/6607 |
| | | | | 184/5.1 |
| 7,066,648 | B2 | * | 6/2006 | Edelmann ............... F16C 29/04 |
| | | | | 184/105.1 |
| 2003/0029677 | A1 | * | 2/2003 | Kurtz ................. F16C 33/6622 |
| | | | | 184/5.1 |
| 2006/0251350 | A1 | * | 11/2006 | Hong ................. F16C 33/1085 |
| | | | | 384/100 |
| 2007/0000132 | A1 | * | 1/2007 | Shimotake ........... F16C 17/107 |
| | | | | 29/898.1 |
| 2007/0193032 | A1 | * | 8/2007 | Takimoto .............. B60B 27/001 |
| | | | | 29/898 |
| 2010/0008609 | A1 | * | 1/2010 | Chen ....................... B22F 5/106 |
| | | | | 384/291 |
| 2010/0135606 | A1 | * | 6/2010 | Ehlert ..................... F16C 23/08 |
| | | | | 384/477 |
| 2012/0170883 | A1 | * | 7/2012 | Evans ................ F16C 33/6651 |
| | | | | 384/462 |
| 2016/0186746 | A1 | * | 6/2016 | Hikichi .................... F04C 2/10 |
| | | | | 60/670 |

* cited by examiner

Fig. 10

# METHOD OF PROVIDING LUBRICANT TO A BEARING ASSEMBLY

INCORPORATION BY REFERENCE

The following documents are incorporated herein by reference as if fully set forth: U.S. Provisional Patent Application No. 61/948,965, filed Mar. 6, 2014.

FIELD OF INVENTION

This invention is generally related to a bearing assembly and more particularly related to a method of providing lubrication to a bearing assembly.

BACKGROUND

Rolling bearing assemblies require lubrication to reduce friction and ensure reliable operation. Various methods exist for supplying lubricant to a bearing assembly, such as providing lubricant feed lines on a periphery of the rolling bearing assembly, or manually coating contact surfaces of the rolling bearing assembly. Lubricant feed lines require an additional machining step during assembly and can be expensive to produce. Lubricant feed lines can also malfunction during operation and/or provide an excessive amount of lubricant to the bearing assembly. Depending on the application, pressurized lubricant may also be unavailable, requiring a predetermined amount of lubricant to be packed in the bearing. Excess lubricant discharged from the bearing assembly may be undesirable for various reasons, for example, the discharged lubricant can cause adjacent electrical components to malfunction, or can be aesthetically undesirable. Manually applying lubricant can also be both time and labor intensive, and is not always reliable at providing a desired amount of lubrication to the desired contact surfaces.

SUMMARY

It would be desirable to provide a simple, clean, and inexpensive way to provide a specified amount of lubrication to a bearing assembly that eliminates or at least substantially reduces the amount of lubricant ejected from the bearing assembly. This is achieved according to the invention by providing a discrete lubricant packet that ruptures during installation or operation of the bearing assembly.

In a preferred arrangement, a method of providing lubricant to a bearing assembly is provided that includes providing a bearing assembly including a housing with an inner surface that forms an outer race, a plurality of rolling elements that roll on the outer race, and a packet having a rupturable membrane and a predetermined volume of lubricant therein. At least one of a shaft or a cage is inserted into the bearing assembly and ruptures the packet via engagement of the packet with at least one of the shaft or the cage such that the predetermined volume of lubricant is distributed to contact surfaces of the bearing assembly.

In another embodiment, a method of providing lubricant to a bearing assembly is provided that includes providing a bearing assembly including a housing with an inner surface that forms an outer race, a plurality of rolling elements that roll on the outer race, and a cage including a plurality of pockets configured to support the plurality of rolling elements. At least one packet having a rupturable membrane and a predetermined volume of lubricant therein is inserted into at least one of the plurality of pockets of the cage, and the at least one packet is ruptured to provide the predetermined volume of lubricant to contact surfaces of the bearing assembly.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c, or combinations thereof. The terminology includes the words specifically noted above, derivates thereof, and words of similar import.

Figure 1:
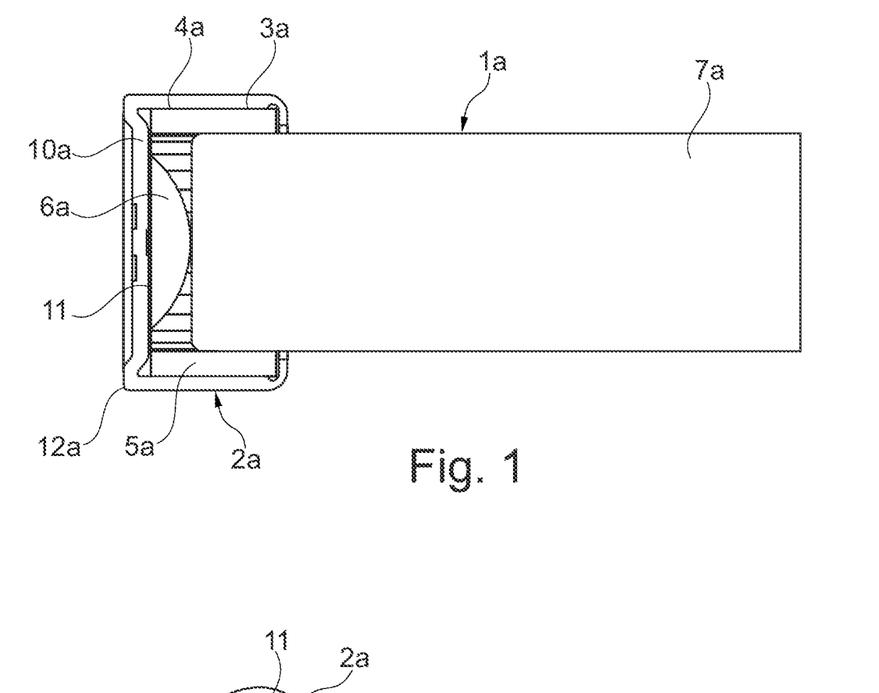
FIG. 1 is side cross-sectional view of a rolling bearing assembly with a lubrication packet according to the present invention.
Figure 2:
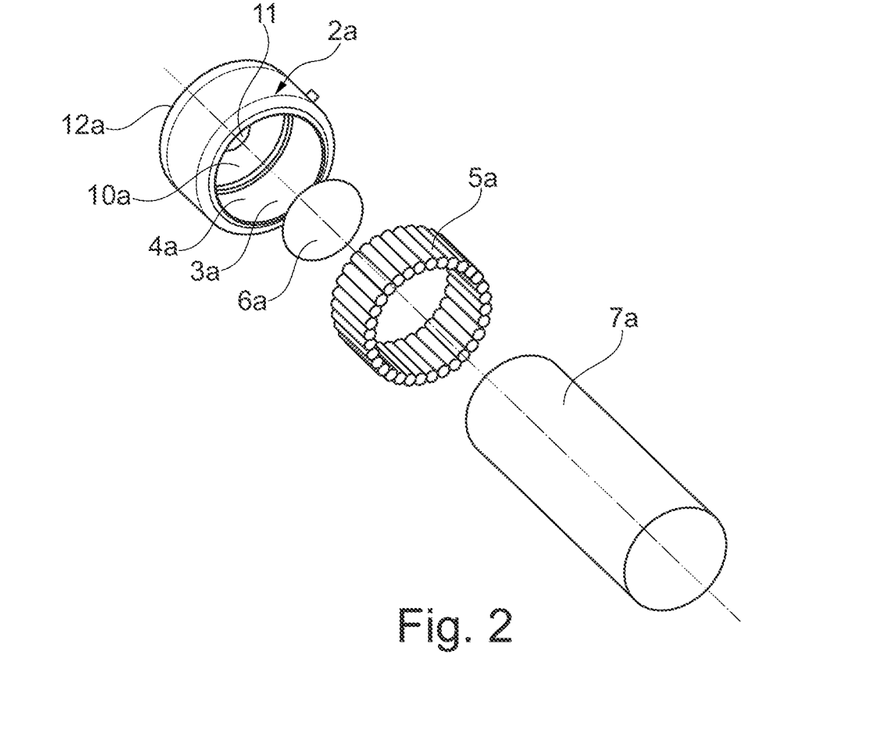
FIG. 2 is an exploded perspective view of the rolling bearing assembly of FIG. 1.

As shown in FIGS. 1 and 2, a first embodiment of a bearing assembly 1a is provided that is lubricated in accordance with one method according to the invention. The method includes providing a bearing assembly 1a including a housing 2a with an inner surface 3a that forms an outer race 4a, a plurality of rolling elements 5a that roll on the outer race 4a, and a packet 6a having a rupturable membrane and a predetermined volume of lubricant therein. Here, the housing 2a can be in the form of a bearing cap, for example for a U-joint. In the first embodiment, the packet 6a is dome-shaped, however, any other suitable shape can be used, and alternate shapes for the packet are described with respect to other embodiments. In the first embodiment, a shaft 7*a* is inserted into the bearing assembly 1*a* and ruptures the packet 6*a* via engagement of the packet 6*a* with the shaft 7*a* such that the predetermined volume of lubricant is distributed to contact surfaces of the bearing assembly 1*a*, such as the outer race 4*a* of the housing 2*a*, an outer surface of the shaft 7*a*, and the plurality of rolling elements 5*a*. In the first embodiment, the housing 2*a* includes a closed bottom portion 10*a* at a first axial end 12*a*, and the method comprises rupturing the packet 6*a* by forcing the packet 6*a* against the closed bottom portion 10*a* of the housing 2*a* during insertion of the shaft 7*a*. As shown in FIGS. 1 and 2, the inner surface of the closed bottom portion 10*a* can include surface irregularities 11 at least at a center area of the closed bottom portion 10*a*. These surface irregularities 11 can provide a surface that helps grip the packet 6*a* during installation.

In any one of the embodiments described herein, the packet 6*a* includes a thin, film-like membrane that is rupturable. In the embodiments described herein, the packet ruptures via a variety of methods, either during the installation or operation of the bearing assembly. In one preferred arrangement, the membrane of the packet dissolves or melts when the packet reaches a certain temperature. The packet can heat up during an operating condition, e.g. when a component is running. In another preferred arrangement, the membrane is formed from a polytetrafluoroethylene, e.g. Teflon®, such that upon rupturing, the remaining particles of the membrane in the bearing assembly also provide a lower friction coefficient material between the contact surfaces of the bearing assembly. The lubricant provided in the packet can be oil, grease, or any other substance suitable for reducing friction between contact surfaces. The packet can be provided in a variety of sizes, colors, and shapes. Markings on the packet or the packet color can serve as indicia of the predetermined volume or type of lubricant contained therein, or the type of application in which the packet should be used.

Figure 3:
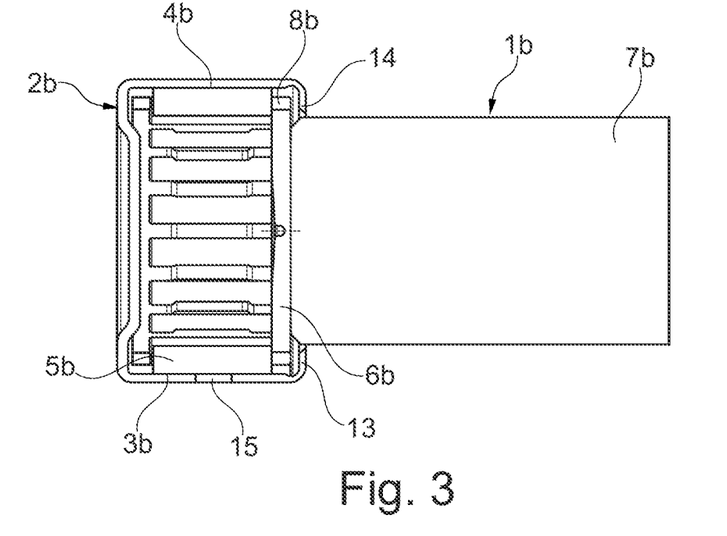
FIG. 3 is a side cross-sectional view of a rolling bearing assembly with a lubrication packet and a cage according to a second embodiment of the present invention.
Figure 4:
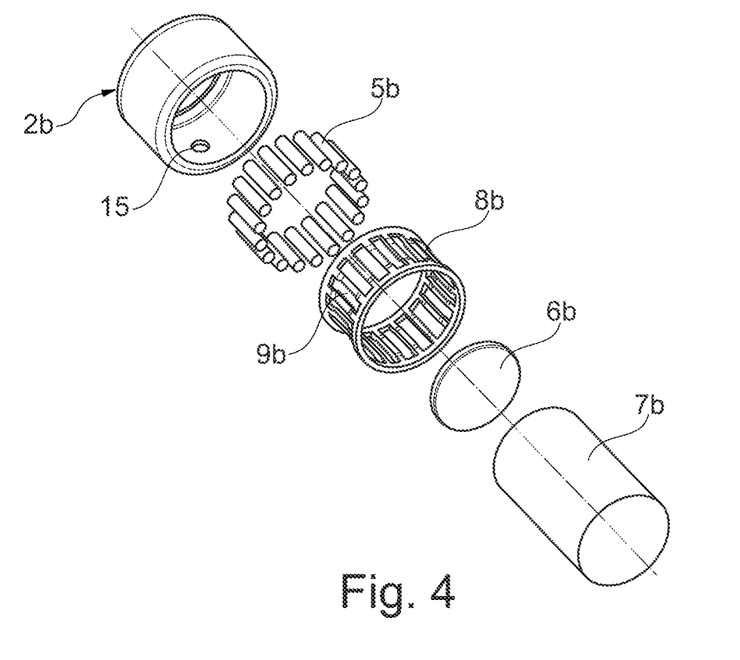
FIG. 4 is an exploded perspective view of the rolling bearing assembly of FIG. 3.

Referring to FIGS. 3 and 4, a second embodiment of a bearing assembly 1*b* that is provided with lubricant according to a method of the invention via a packet 6*b* is shown. The method according to the second embodiment is similar to the method according to the first embodiment, except a cage 8*b* is provided, and the housing 2*b* includes a radially inwardly extending flange 13 on a second axial end 14 having an inner diameter that is less than an outer diameter of the packet 6*b*. The packet 6*b* is supported between the cage 8*b* and the flange 13. The cage 8*b* includes a plurality of pockets 9*b* configured to support the plurality of rolling elements 5*b*. The method according to the second embodiment includes forcing the packet 6*b* through the inner diameter of the cage 8*b* and rolling elements 5*b* as the shaft 7*b* is inserted such that the packet 6*b* ruptures due to interference between the inner diameter of the cage 8*b* and the outer diameter of the packet 6*b*, providing the predetermined volume of lubricant during assembly. As shown in FIGS. 3 and 4, the packet 6*b* is disc-shaped and has a cross-section that tapers between its periphery and a center portion such that an area of the packet 6*b* in the center of the packet 6*b* has a smaller cross-section than an area around the periphery of the packet 6*b*. In one preferred embodiment, the center portion of the packet 6*b* has a notch directly at a center axis of the packet 6*b*. As shown in FIGS. 3 and 4, the housing 2*b* can include a bore 15, which can be used for supplying additional lubricant to the bearing assembly or for draining excess lubricant from the bearing assembly. Although the bore 15 is only shown in the second embodiment, one of skill in the art recognizes a bore could be provided in the housing for any of the embodiments described herein.

Figure 5:
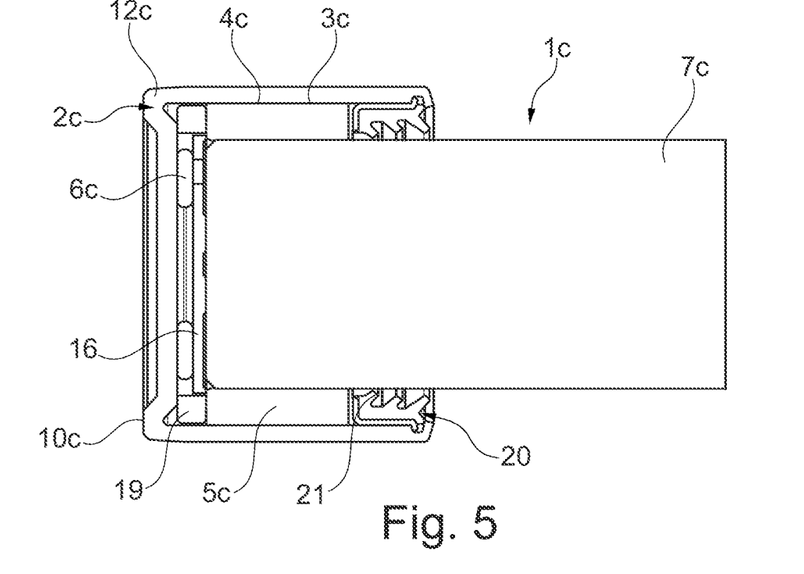
FIG. 5 is a side cross-sectional view of a rolling bearing assembly with a lubrication packet and a washer according to a third embodiment of the present invention.
Figure 6:
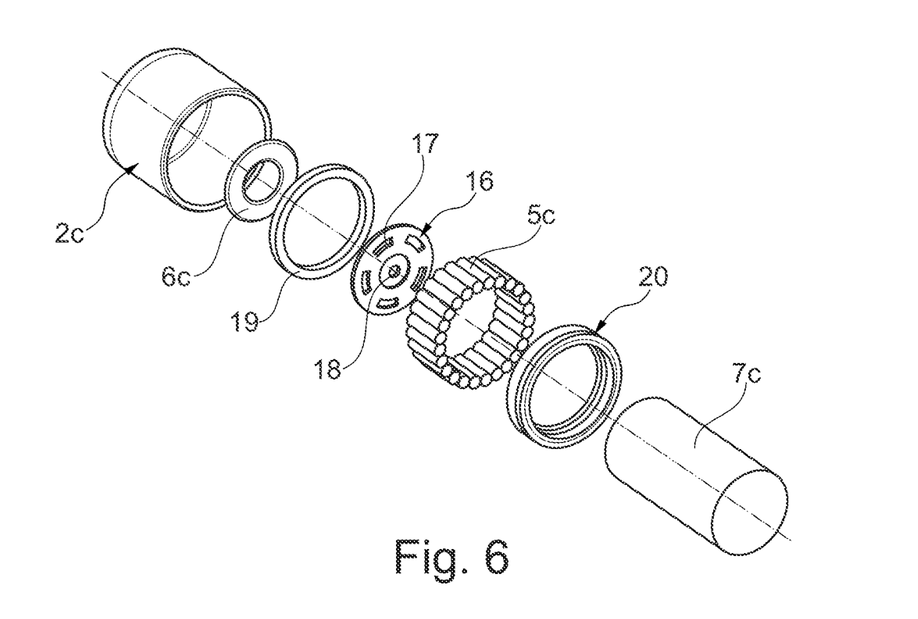
FIG. 6 is an exploded perspective view of the rolling bearing assembly of FIG. 5.

Referring to FIGS. 5 and 6, a third embodiment of a bearing assembly 1*c* that is provided with lubricant according to a method of the invention via a packet 6*c* is shown. The method according to the third embodiment is similar to the method according to the first embodiment in that the bearing assembly 1*c* includes a housing 2*c* with a closed bottom portion 10*c*, and insertion of the shaft 7*c* into the bearing assembly 1*c* ruptures the packet 6*c* such that the volume of lubricant is distributed to contact surfaces of the bearing assembly 1*c*. The method according to the third embodiment includes providing a washer 16 between the packet 6*c* and the shaft 7*c* that includes a plurality of axially extending slots 17 for assisting in rupturing the packet 6*c* and directing the lubricant to the contact surfaces of the bearing assembly 1*c* after rupturing the packet 6*c*. In one preferred arrangement of the third embodiment, the packet 6*c* is toroidal shaped. The washer 16 includes a detachable ring 19 around its periphery. In one preferred arrangement, the washer 16 and detachable ring 19 are detached upon application of an axial force from the insertion of the shaft 7*c* into the bearing assembly 1*c*. After detaching from the washer 16, the detachable ring 19 is radially positioned between the washer 16 and the inner surface 3*c* of the housing 2*c*, and axially positioned between the closed bottom portion 10*c* of the housing 2*c* and the plurality of rolling elements 5*c*. The washer 16 can also include an axial slot 18 positioned at a center axis of the washer 16. A seal 20 can be provided adjacent to a first axial end 12*c* of the housing 2*c* for preventing the egress of lubricant from the bearing assembly 1*c*. In one preferred arrangement, the seal 20 includes a plurality of sealing lips 21.

Figure 7:
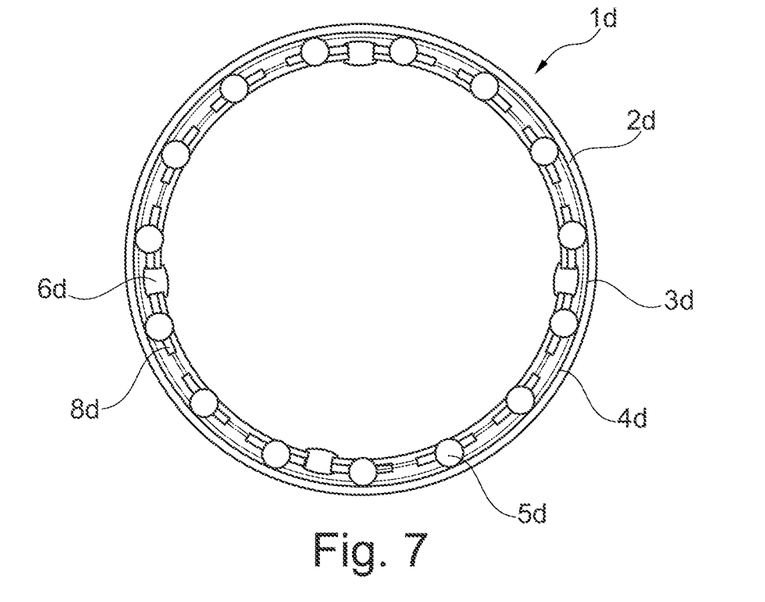
FIG. 7 is an axial cross-sectional view of a rolling bearing assembly with a plurality of lubrication packets and a cage according to a fourth embodiment of the present invention.
Figure 8:
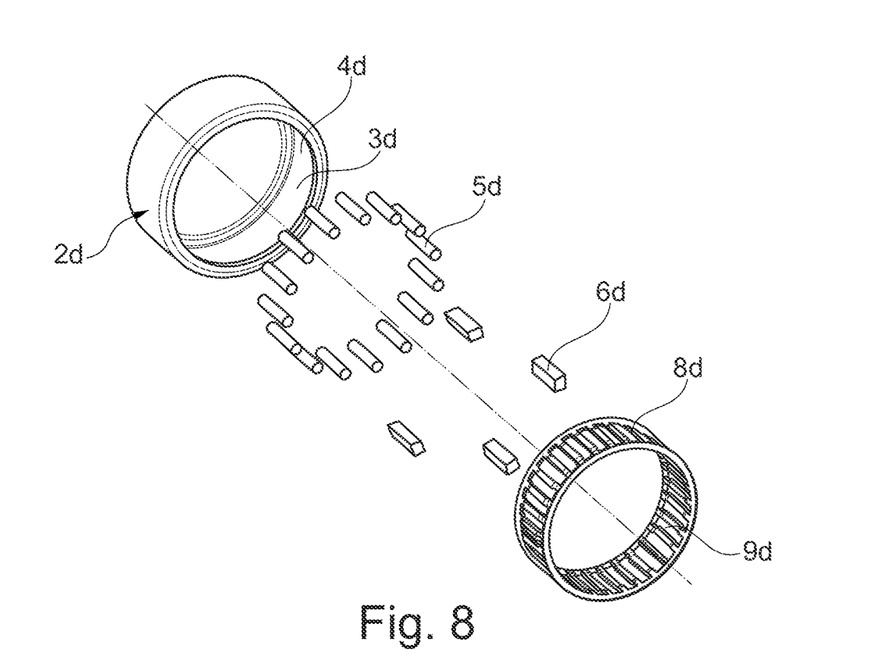
FIG. 8 is an exploded perspective view of the rolling bearing assembly of FIG. 7.

Referring to FIGS. 7 and 8, a fourth embodiment of a bearing assembly 1*d* that is provided with lubricant according to a method of the invention via at least one packet 6*d* is shown. The method according to the fourth embodiment includes providing a bearing assembly 1*d* and a housing 2*d* with an inner surface 3*d* that forms an outer race 4*d*, a plurality of rolling elements 5*d* that roll on the outer race 4*d*, and a cage 8*d* including a plurality of pockets 9*d* configured to support the plurality of rolling elements 5*d*. The housing 2*d* of the fourth embodiment includes two open axial ends. The method includes inserting at least one packet 6*d* having a rupturable membrane and a volume of lubricant therein into at least one of the plurality of pockets 9*d* of the cage 8*d*. The at least one packet 6*d* preferably has an interference fit in the respective one of the plurality of pockets 9*d* of the cage 8*d* that holds the packet 6*d* in position. The method includes rupturing the at least one packet 6*d* to provide the volume of lubricant to contact surfaces of the bearing assembly 1*d*. The at least one packet 6*d* is ruptured during insertion of the shaft 7*d* into the bearing assembly 1*d*, during insertion of the cage 8*d* into the bearing assembly 1*d*, or during rotation within the cage 8*d* due to friction and/or centrifugal forces acting on the at least one packet 6*d*. In a preferred arrangement of the fourth embodiment shown more clearly in FIG. 7, the at least one packet 6*d* has an I-shaped cross-section. In a more preferred embodiment, the at least one packet 6*d* has two axial ends having a first cross-section and a tapered medial portion having a second cross-section that is less than the first cross-section of the axial ends. The tapered medial portion of the at least one packet 6*d* engages against side walls of a respective one of the plurality of pockets 9*d* of the cage 8*d*. In the arrangement shown in FIGS. 7 and 8 four packets 6d are provided, however one of skill in the art would recognize any number of packets 6d could be provided within the pockets 9d of the cage 8d, depending on the need for lubricant in a given application.

Figure 7A:
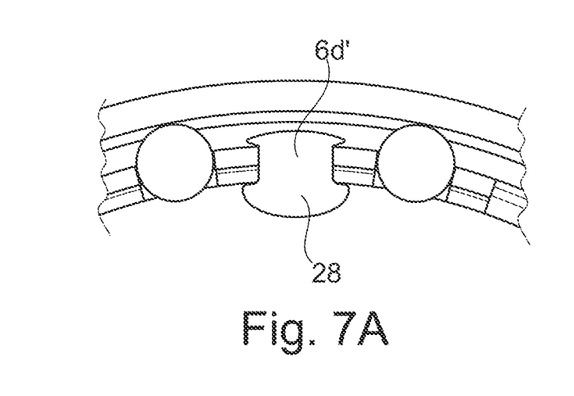
FIG. 7A is a magnified view of an alternative embodiment of the lubrication packet in the cage of FIG. 7.

FIG. 7A shows a magnified view of an alternative embodiment of the at least one packet 6d' from FIGS. 7 and 8 with an enlarged radially inner portion 28 for the lubricant. In this embodiment, the radially inner portion 28 of the at least one packet 6d' ensures that the at least one packet 6d' ruptures during assembly or rotation.

Figure 9:
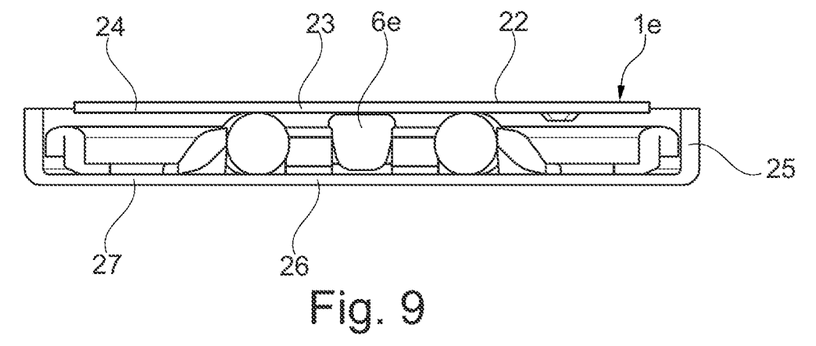
FIG. 9 is a side cross-sectional view of an axial rolling bearing assembly with a plurality of lubrication packets and a cage according to a fifth embodiment of the present invention.
Figure 10:
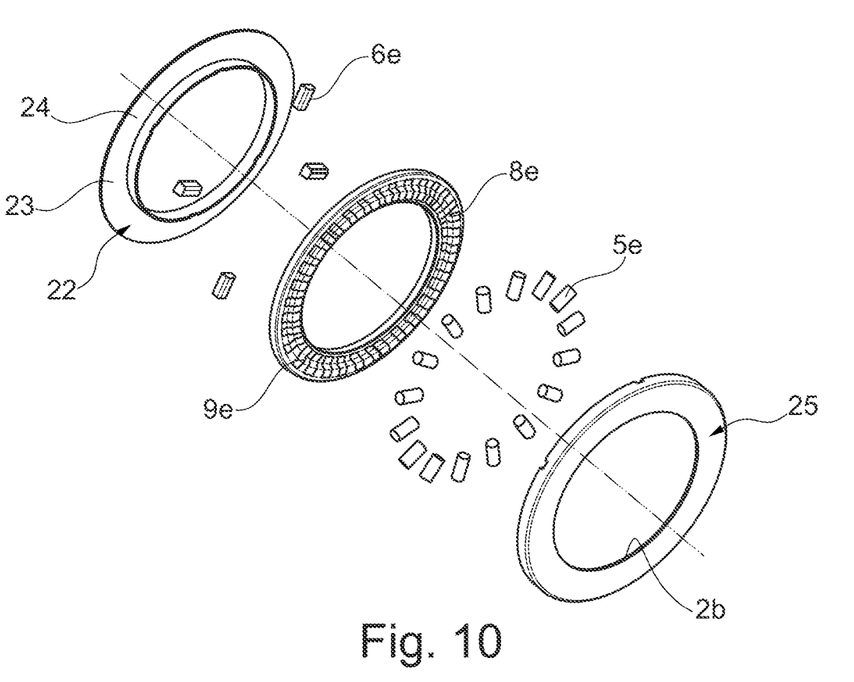
FIG. 10 is an exploded perspective view of the rolling bearing assembly of FIG. 9.

Referring to FIGS. 9 and 10, a fifth embodiment of a bearing assembly 1e that is provided with lubricant according to a method of the invention via at least one packet 6e is shown. The bearing assembly 1e of the fifth embodiment differs from the other embodiments since the bearing assembly 1e is an axial bearing. The axial bearing assembly 1e includes a first ring 22 with a first axial surface 23 that forms a first race 24 and a second ring 25 with a second axial surface 26 that forms a second race 27. Preferably, the first ring 22 includes an axially extending inner flange, and the second ring 25 includes an axially extending outer flange. The bearing assembly 1e includes a cage 8e including a plurality of pockets 9e configured to support the plurality of rolling elements 5e. The plurality of rolling elements 5e roll between the first race 24 on the first ring 22 and the second race 27 on the second ring 25. The at least one packet 6e of the fifth embodiment is preferably wedge-shaped such that the at least packet 6e has a slight interference fit when inserted into a respective one of the plurality of pockets 9e in the cage 8e. The at least one packet 6e of the fifth embodiment can rupture during insertion of the at least one packet 6e into the pocket 9e, during assembly of the first ring 22 and the second ring 25, or during rotation of the cage 8e due to relative rotation of the first and second rings 22, 25. Again, although four packets 6e are shown in the fifth embodiment, one of ordinary skill in the art would recognize any number of the packets 6e can be used, depending on the bearing application.

Figure 11:
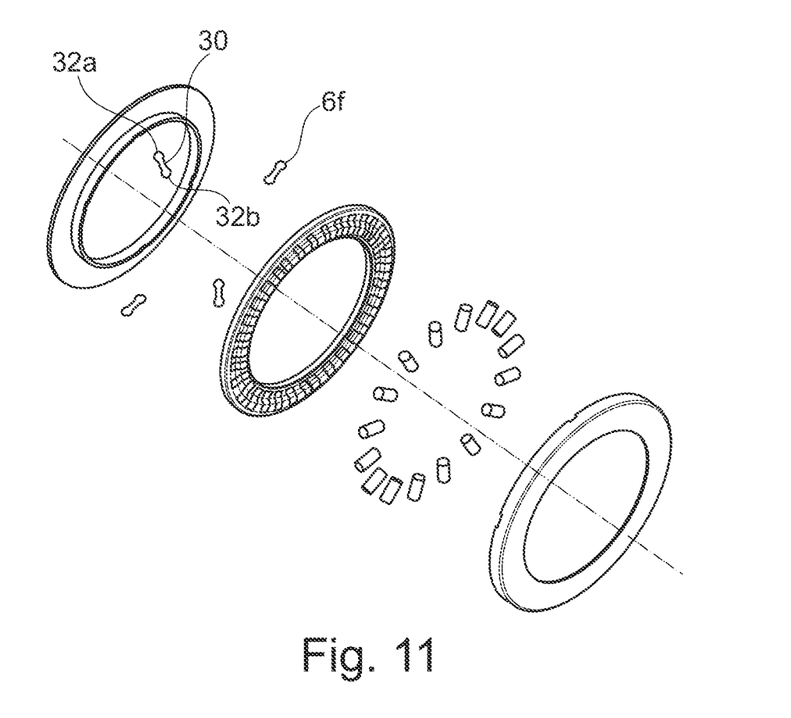
FIG. 11 is an exploded perspective view of a rolling bearing assembly according to a sixth embodiment of the present invention.

FIG. 11 shows an alternative embodiment of the at least one packet 6f. The unlabeled components from FIG. 11 are similar to FIG. 10, including the rings, rolling elements, and cage. In this embodiment, the at least one packet 6f has a tapered medial portion 30 and enlarged end portions 32a, 32b. The cross-sectional area of the at least one packet 6f is a "dog-bone" type shape, which promotes the ends 32a, 32b of the packet 6f to rupture during assembly or rotation. One of ordinary skill in the art will recognize that a number of shapes for the packets could be used, including rivet-shaped, mushroom-shaped, or any other shape including enlarged end portions.

Through the use of the packets 6a-6f, a predetermined volume of lubricant is guaranteed for the bearing during assembly with the corresponding shaft. This eliminates inconsistencies found in manual packing of lubricant in the bearing assembly.

Having thus described various embodiments of the method of providing lubricant to a bearing assembly in detail, it is to be appreciated and will be apparent to those skilled in the art that many changes, only a few of which are exemplified in the detailed description above, could be made in the method without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS 1a-1e. Assembly
2a-2e. Housing
3a-3d. Inner surface of housing
4a-4d. Outer race
5a-5e. Rolling elements
6a-6f. Packet
7a-7c. Shaft
8b, 8d, 8e. Cage
9b, 9d, 9e. Pocket of Cage
10a, 10c. Closed bottom portion of housing
11. Irregularities of closed bottom portion of housing
12a, 12c. First axial end of housing
13. Radially inwardly extending flange
14. Second axial end of housing
15. Bore
16. Washer
17. Axially Extending Slots of Washer
18. Center Slot of Washer
19. Detachable Ring
20. Seal
21. Sealing Lips
22. First Ring
23. First Axial Surface
24. First Race
25. Second Ring
26. Second Axial Surface
27. Second Race

What is claimed is:

1. A method of providing lubricant to a bearing assembly, the method comprising:
providing a bearing assembly including a housing with an inner surface that forms an outer race, a plurality of rolling elements that roll on the outer race, and a packet having a rupturable membrane and a predetermined volume of lubricant therein, the packet being positioned within the housing;
installing the bearing assembly; and
installing at least one of a shaft or a cage into the installed bearing assembly and rupturing the rupturable membrane of the packet via engagement of the packet with the at least one of the shaft or the cage such that the predetermined volume of lubricant is distributed to contact surfaces of the installed bearing assembly and a contact surface of the at least one of the shaft or the cage.

2. The method of claim 1, wherein the housing includes a closed bottom portion on a first axial end, and the method further comprises at least one of the shaft or the cage rupturing the packet by forcing the packet against the closed bottom portion of the housing.

3. The method of claim 1, wherein the at least one of the shaft or the cage is the shaft and the cage, such that the cage and the shaft are inserted into the installed bearing assembly, the housing includes a radially inwardly extending flange on a second axial end having an inner diameter that is less than an outer diameter of the packet, and the method further comprises retaining the packet between the inner diameter of the flange and the cage, and rupturing the packet by insertion of the shaft due to interference between the outer diameter of the packet and the cage.

4. The method of claim 1, wherein the at least one of the shaft or the cage is the shaft, the shaft is inserted in the installed bearing assembly, and further comprising providing a washer between the packet and the shaft that includes a plurality of axially extending slots for directing the predetermined volume of lubricant to the contact surfaces of the bearing assembly after rupturing the packet.

5. The method of claim 4, wherein the packet is toroidal shaped.

6. The method of claim 1, wherein the rupturable membrane of the packet is formed from polytetrafluoroethylene.

7. The method of claim 1, wherein the rupturable membrane of the packet is color coded to indicate at least one of the predetermined volume of the packet or a type of lubricant in the packet.

8. A method of providing lubricant to a bearing assembly, the method comprising:

providing a bearing assembly including a housing with an inner surface that forms an outer race, a plurality of rolling elements that roll on the outer race, and a cage including a plurality of pockets configured to support the plurality of rolling elements;

installing the bearing assembly;

inserting at least one packet having a rupturable membrane and a predetermined volume of lubricant therein into at least one of the plurality of pockets of the cage; and rupturing the rupturable membrane of the at least one packet during or after installation of a shaft to provide the predetermined volume of lubricant to contact surfaces of the installed bearing assembly and a contact surface of the shaft.

9. The method of claim 8, wherein the at least one packet includes two axial ends having a first cross-section and a tapered medial portion having a second cross-section that is less than the first cross-section.

* * * * *